Figure 1:
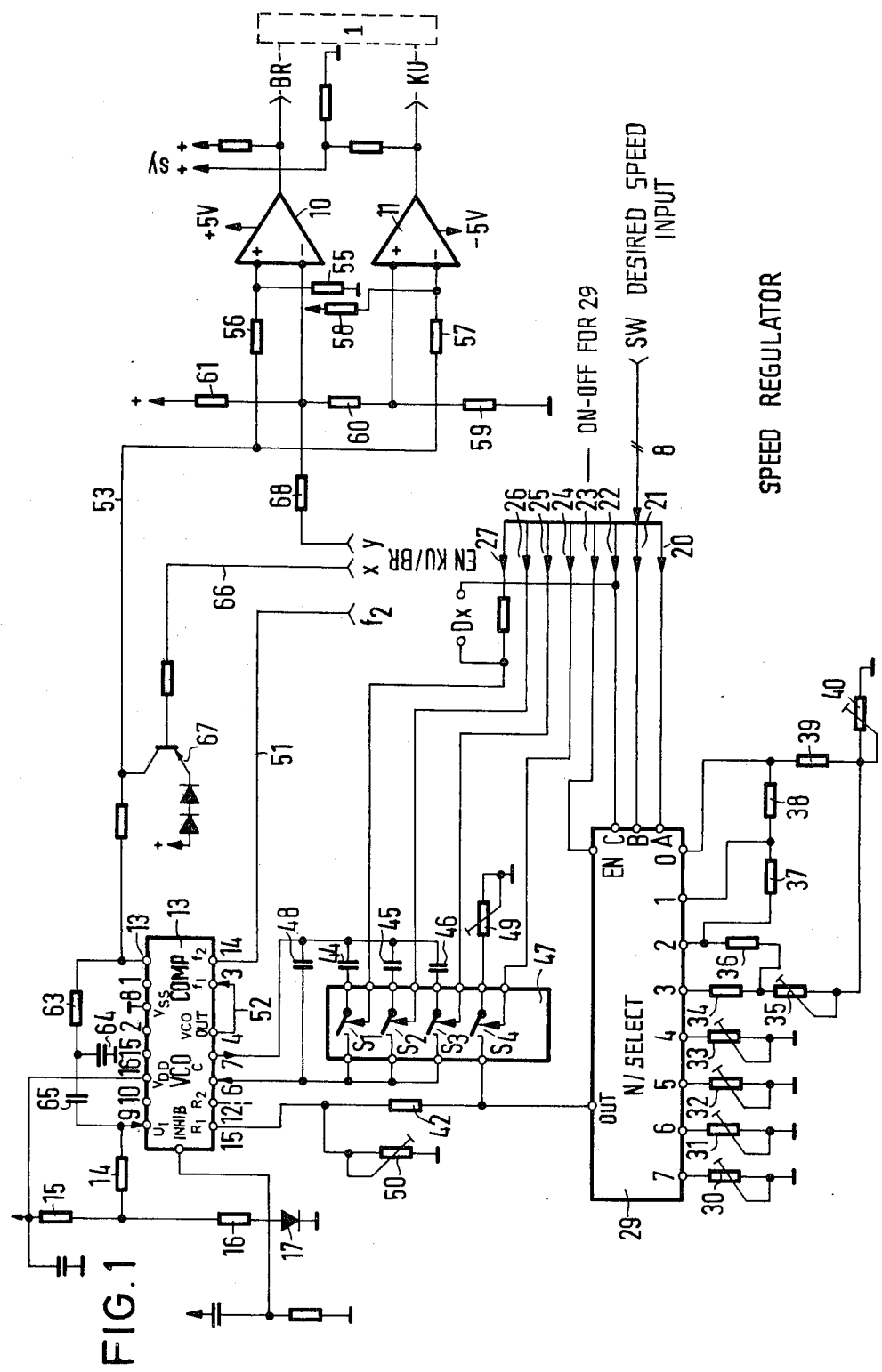

United States Patent [19]

Angersbach et al.

[11] 4,412,163

[45] Oct. 25, 1983

[54] POSITIONING DRIVE

[75] Inventors: Wolfgang Angersbach, Darmstadt; Peter Schüler, Obertshausen, both of Fed. Rep. of Germany

[73] Assignee: Quick-Rotan Elektromotoren GmbH, Darmstadt, Fed. Rep. of Germany

[21] Appl. No.: 187,971

[22] Filed: Sep. 16, 1980

[30] Foreign Application Priority Data

Sep. 20, 1979 [DE] Fed. Rep. of Germany ....... 2938040
Mar. 26, 1980 [DE] Fed. Rep. of Germany ....... 3011587

[51] Int. Cl.³ .............................................. G05B 19/00
[52] U.S. Cl. ................................... 318/567; 318/600; 112/121.11
[58] Field of Search ............... 318/567, 568, 596, 600; 112/121.12, 121.11, 158 E

[56] References Cited

U.S. PATENT DOCUMENTS

| | | | |
|---|---|---|---|
| 4,085,691 | 4/1978 | Coughenour .................... | 318/568 X |
| 4,092,938 | 6/1978 | Coughenour et al. ......... | 318/568 X |
| 4,104,976 | 8/1978 | Landau et al. ................... | 318/568 X |
| 4,142,158 | 2/1979 | Belisomi .............................. | 331/1 A |
| 4,190,007 | 2/1980 | Kimura et al. ................. | 112/121.12 |
| 4,258,636 | 3/1981 | Rolauffs et al. ................. | 112/121.12 |
| 4,290,375 | 9/1981 | Tonomura et al. ............ | 112/121.12 |
| 4,323,022 | 4/1982 | Hanyu et al. ................... | 112/158 E |

*Primary Examiner*—B. Dobeck
*Attorney, Agent, or Firm*—Michael J. Striker

[57] ABSTRACT

A positioning drive for a serving machine of the type having a variable speed motor and functional means driven by the motor. A microprogram system controls the motor and the functional means in response to a program data source.

19 Claims, 14 Drawing Figures

SPEED REGULATOR

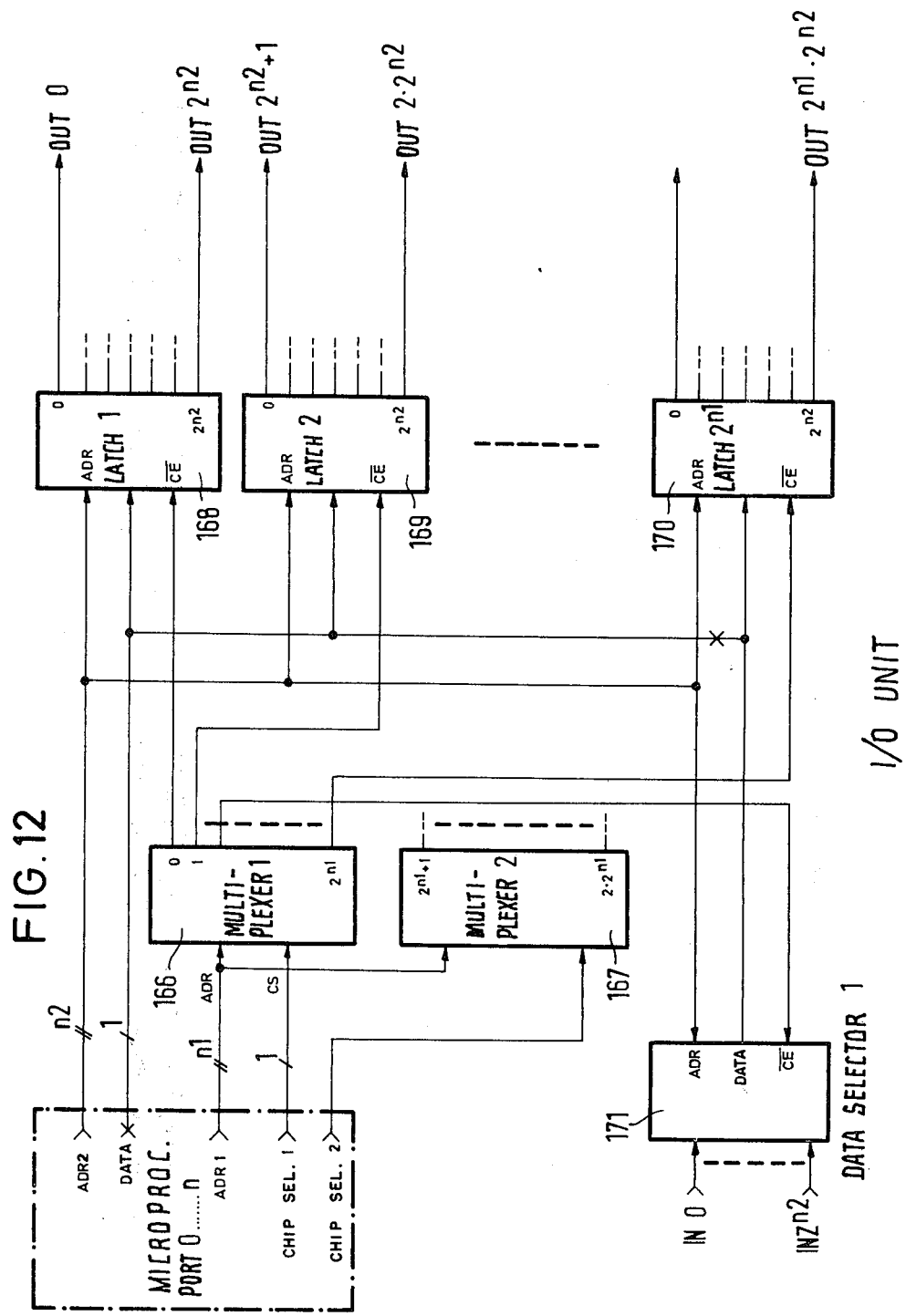

POSITIONING DRIVE

Positioning drives are known in various designs. Hitherto they have been provided in general with a coupling motor with electromagnetically activated brake and electromagnetically activated coupling. Brake and coupling are energized by a speed control arrangement operating an amplitude comparison between a desired speed value obtained as voltage amplitude, and an actual speed. Furthermore, there is provided a position indicator for sensing the angular position of a driven, work-performing, machine and for supplying position signals when the respective shaft has arrived at predetermined angular positions, said positions, for instance in a sewing machine drive, corresponding to the upper and/or lower needle position. Just as an example, reference is made to U.S. Pat. No. 3,487,438, 3,599,764 and 3,761,790. The rotary-speed indicator and the position indicator may be integrated into a module in the form of an angular encoder, as for instance known from U.S. Pat. No. 3,995,156. In such drives, individual operating cycles, have also already been automated. (U.S. Pat. No. 4,107,592).

Positioning drives known leave, however, something to be desired in respect of precise speed regulation, as well as in respect of versatility and flexibility of the drive per se. Increasingly higher demands are also put forward relative to the operators comfort with such drives.

The object of the invention is to provide a positioning drive which will provide precise speed regulation over wide speed ranges and non-sensitive to load variations, with a particularly rapid feedback of actual speed to desired speed, with short standstills and high positioning precision, thus resulting in outstanding control quality, while allowing, in a simple manner, to answer specific customer demands and offering high operator comfort.

In order to solve this task, the positioning drive is provided as per invention with a minimum 8-bit microprocessor system allowing individual call-off of a plurality of function cycles.

According to a further concept of the invention, there is provided for speed regulation of phase-locked loop (PLL) system operating as three-point control circuit. Speed regulation by the PLL system allows for particularly small time constants within the regulating circuit. Provision in made herein for a rapid feedback of the actual speed and for particularly rapid regulation overall. Since the microprocessor on its part will set up its logic circuit within the shortest periods, the positioning system will be of an extraordinary fast response, shorter dead times and increased precision. Speed-regulating or positioning commands will be executed extremely fast. The microprocessor system will furthermore allow combination of standard programs of different machine units in one or in a few modules, e.g. for controlling attachments on sewing machines of differing manufacture. A minimum expenditure for the respective devices is ensured thereby. The positioning system allows universal application. By virtue of internal processing of commands in the microprocessor module, the drive is outstanding in respect of defect-free operation.

The PLL system is provided with a voltage-controlled oscillator and a subsequently arranged comparator acting as phase comparator. In order to suppress regulator oscillations, a feedback loop is arranged from the comparator output to the voltage input of the voltage-controlled oscillator.

If the positioning drive is provided in the known manner with a coupling motor, speed regulation will preferably be effected by digital signals from the PLL system applied directly to the coupling-braking magnet system of the coupling motor. This will result in a further reduction of electrical time constants which is thus effected at the lowest expenditure for circuitry. The fastest possible adjustment of actual speed will thus ensue either when the desired speed is to be changed or upon load fluctuations.

The microprocessor system may be arranged as single-chip system with fixed program. A multi-chip system may, however, be provided instead, the data outputs of which are provided with storage flip-flops (latches) as switches, said flip-flops being selected by a multiplexer system. This will allow an extremely economical increase of function outputs, whereby it is possible to arrange for several hundred outputs in one system.

In case of such an arrangement, the positioning drive will allow performing complete automatic programs, for instance programs for automatic sewing machines.

In an arrangement with multi-chip system and a program storage allowing programming at will, it is, furthermore, of advantage to make provision for programming by a program-carrier reader connectable to the program storage.

Such an arrangement will permit, first to set up a program carrier for a desired operating program, for instance a sewing program, and then, by using this program carrier, effecting programming as often and for as many drives as desired, simply by inserting the program carrier or a duplicate thereof into the respective reader. A program library for all repetitive operating programs may thus be set up. Any programming by the seamstress herself may thus be dispensed with. Programming work may be reduced overall, since, in principle, each program need be set up and transferred to the program carrier only once.

Punched tape is particularly suitable as program carrier, although, in principle, any other program carrier, e.g. magnetic tape, magnetic discs or similar, may also be taken into consideration. Accordingly, there is preferably provided a punched tape reader as program-carrier reader. When using punched tape, the program may simply be transmitted by teletype from a program-collecting location to the program user.

It will be appropriate, to interpose, between program-carrier reader and program storage of the positioning drive an impulse former for bringing the reader output signals into a format suitable for the program storage.

The program storage itself is preferably arranged as RAM storage (writing/reading storage with random access) although, in principle, operation is possible with any storage allowing program changing; e.g. REPROM storage (reprogrammable read-only storage), EAROM storage (electrically changeable fixed-values storage) or EPROM storage (erasable and programmable fixed-value storage).

Figure 2:
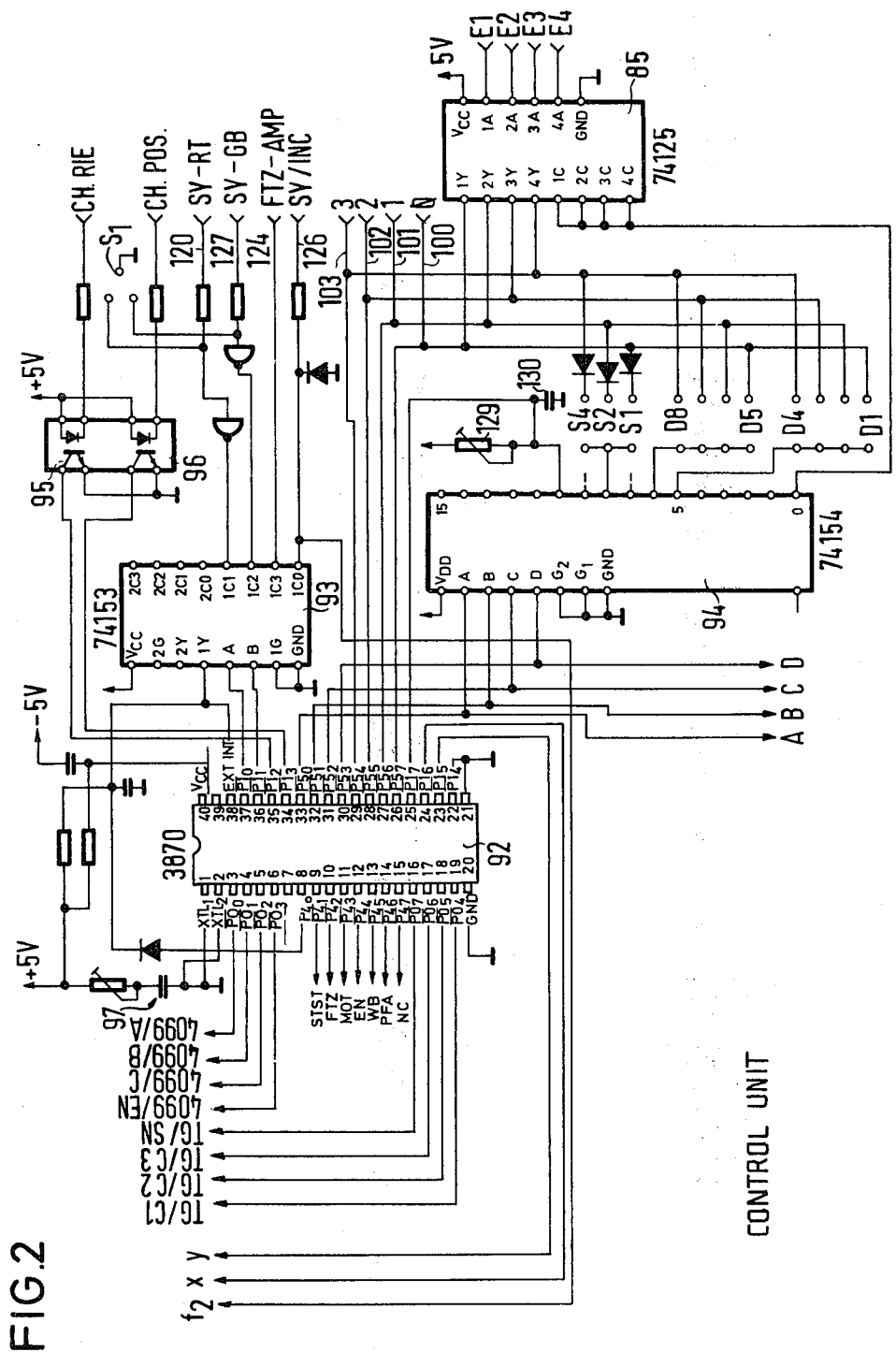

Further characteristics and advantages of the invention are evident from the subordinate claims and the following description. The invention is described more closely below, using preferred embodiments for a sewing-machine drive. Shown in the appended drawings are:

FIG. 1 the speed regulator for the positioning drive as per invention,

FIG. 2 the microprocessor -control arrangement as single-chip system which acts cooperatively with the spped regulator as per FIG. 1.

Figure 3:
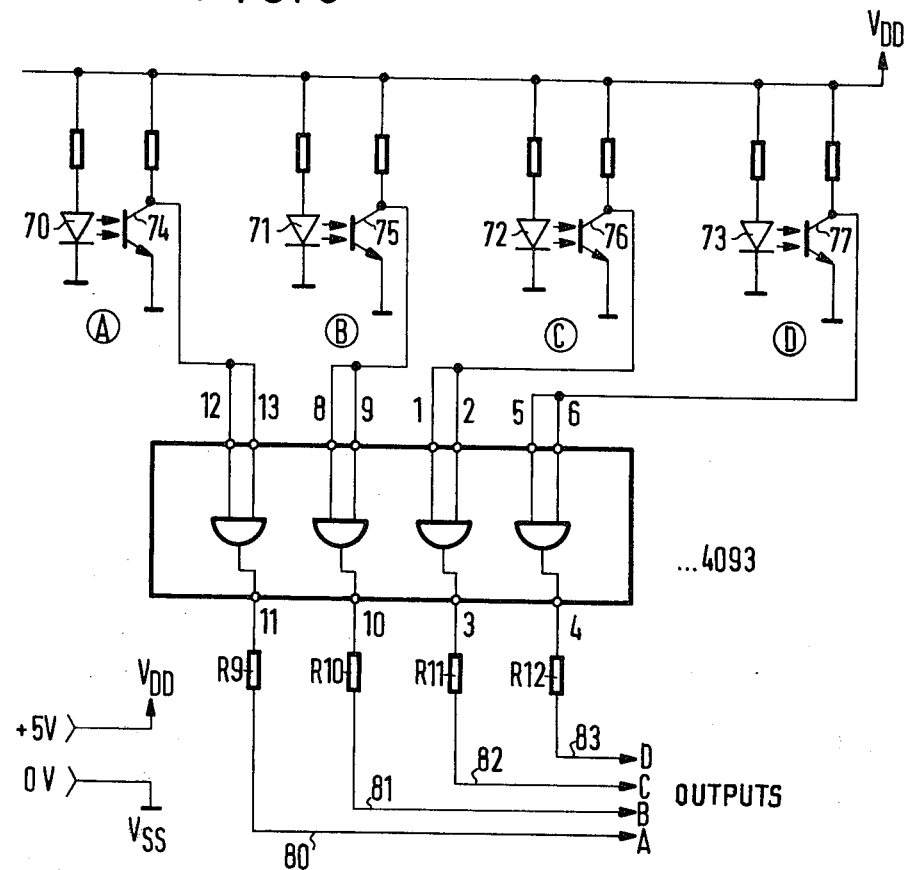

FIG. 3 the desired-speed transmitter:for the arrangement as per FIGS. 1 and 2

Figure 3A:
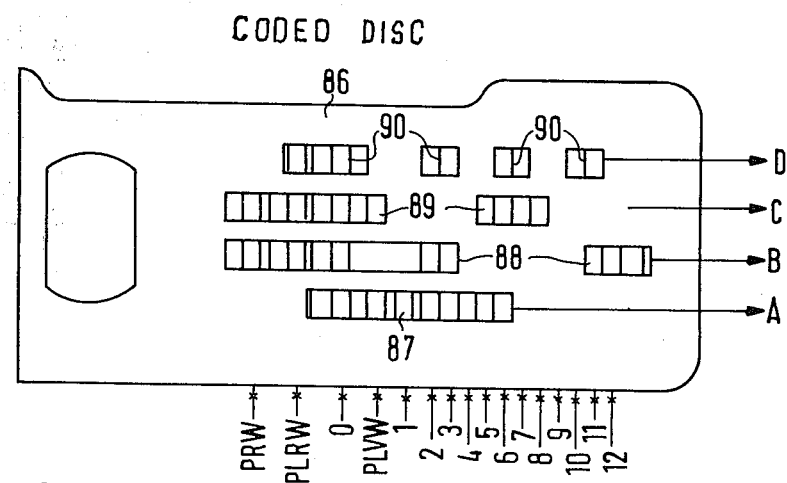

FIG. 3A the coded disc cooperating with the transmitter of FIG. 3

Figure 4:
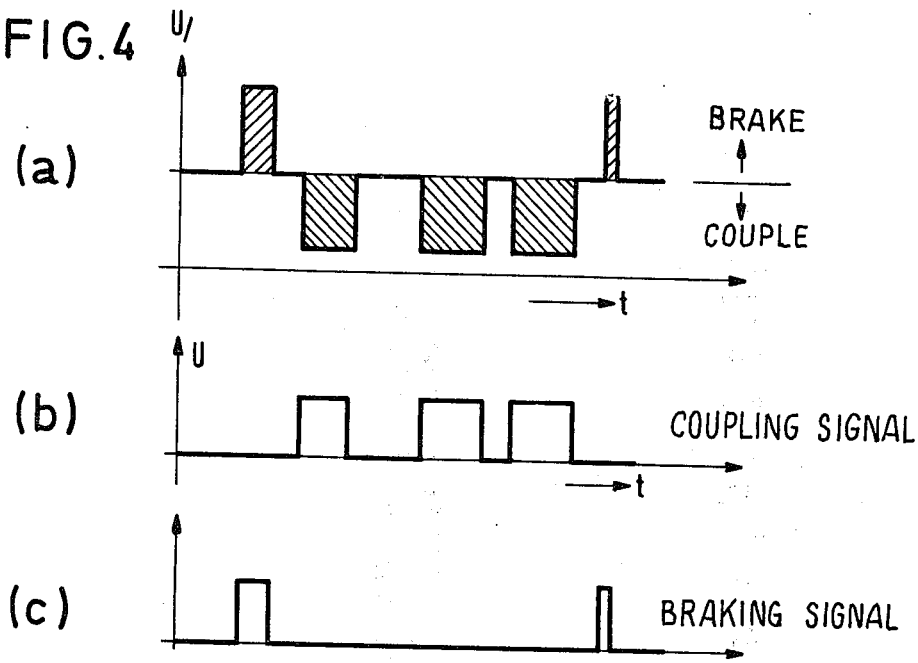
Figure 5:
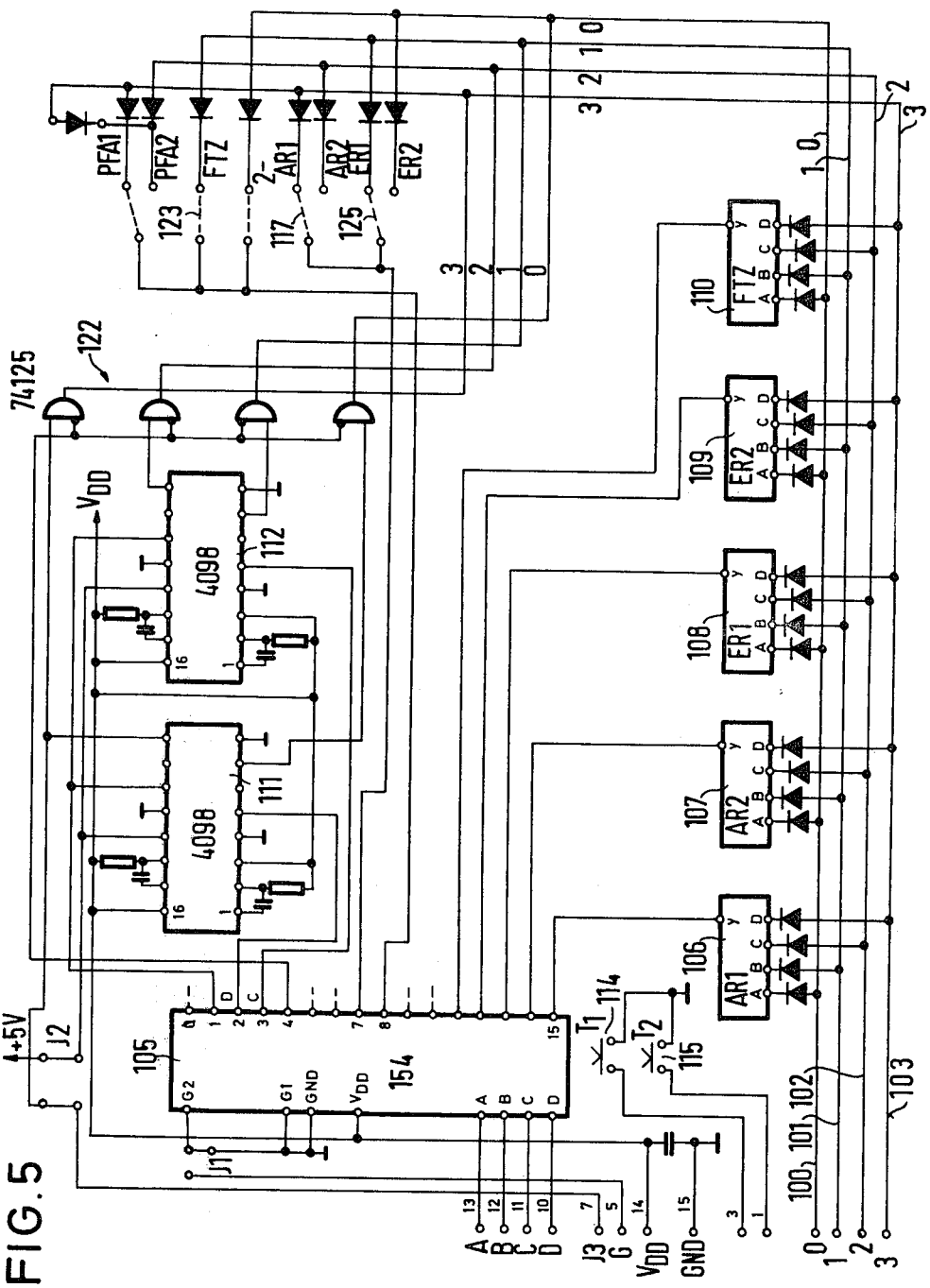

FIG. 4 signal paths for the output signal of the PLL Module of speed regulator as per FIG. 1, as well as for the coupling and braking signals, FIG. 5 a block diagram for the components used to operate the arrangement as per FIGS. 1 to 3

Figure 6:
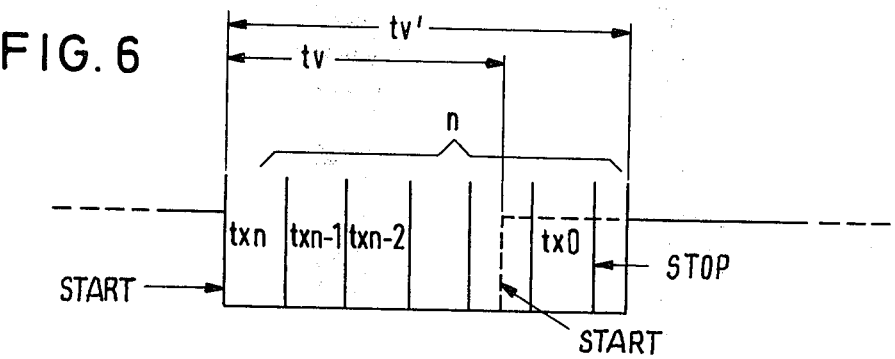

FIG. 6 a time diagram and for digital speed-sensing

Figure 6A:
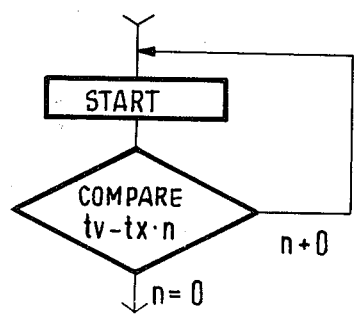

FIG. 6A a flow diagram for rotary speed computation

Figure 7:
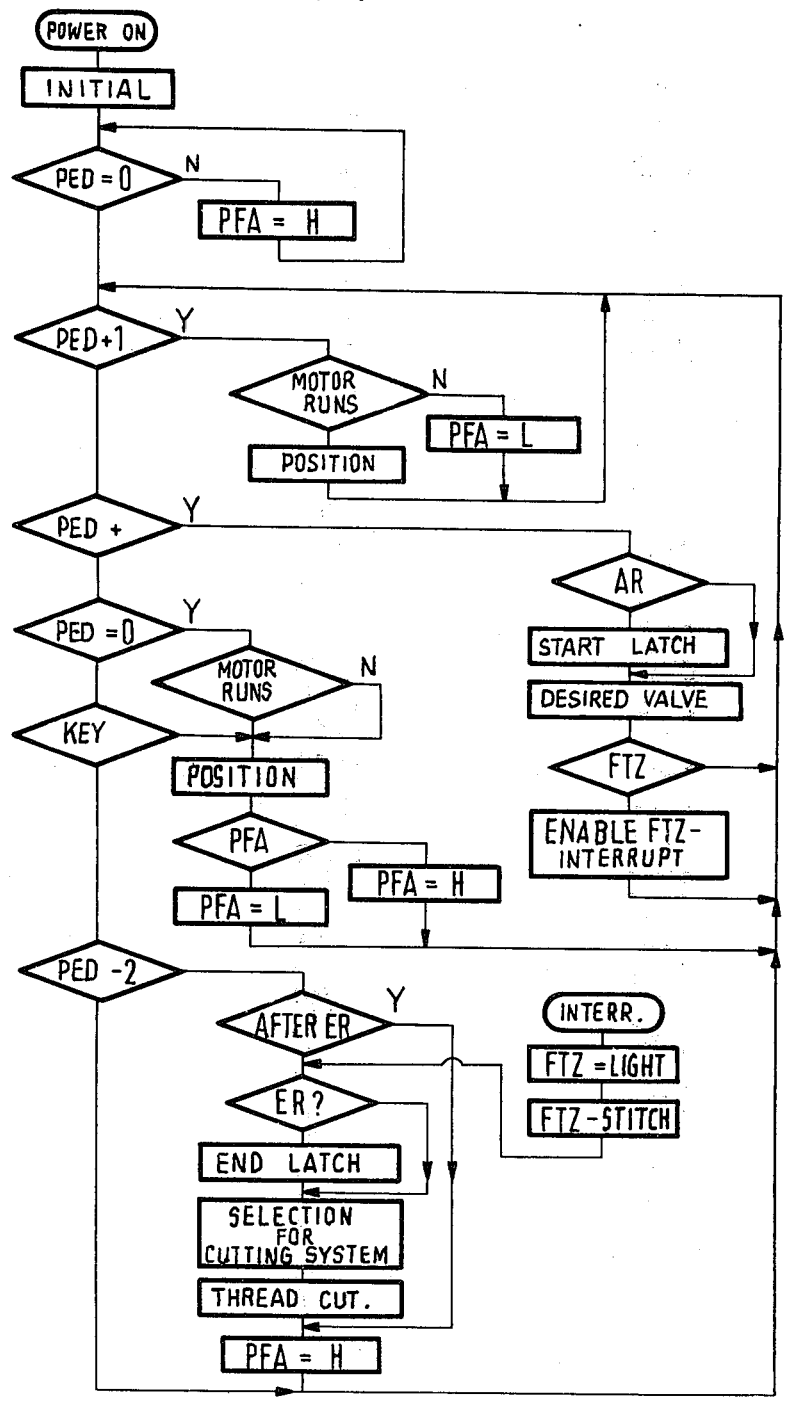

FIG. 7 a flow diagram for the microprocessor-controlled positioning drive

Figure 8:
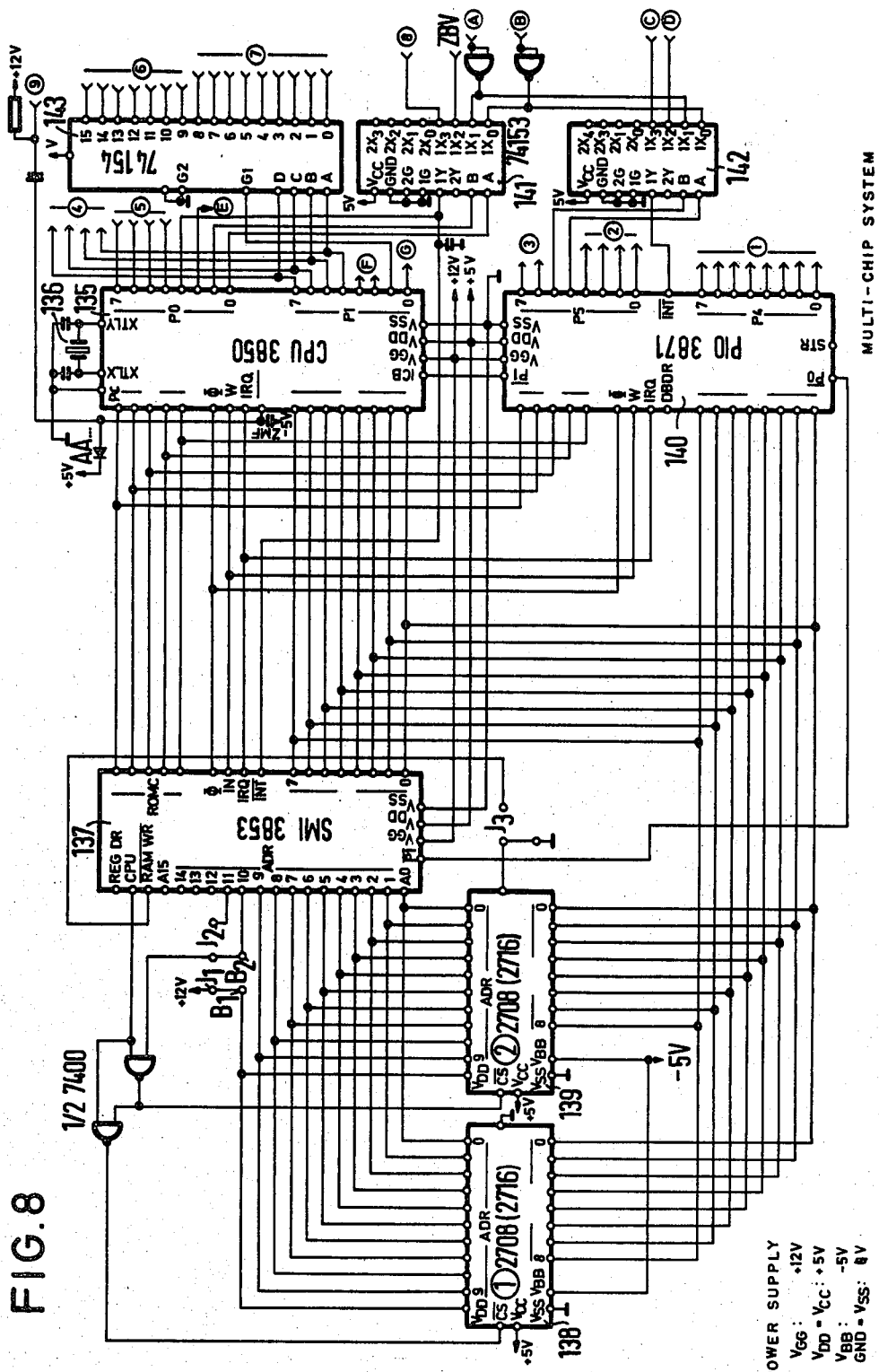
Figure 9:
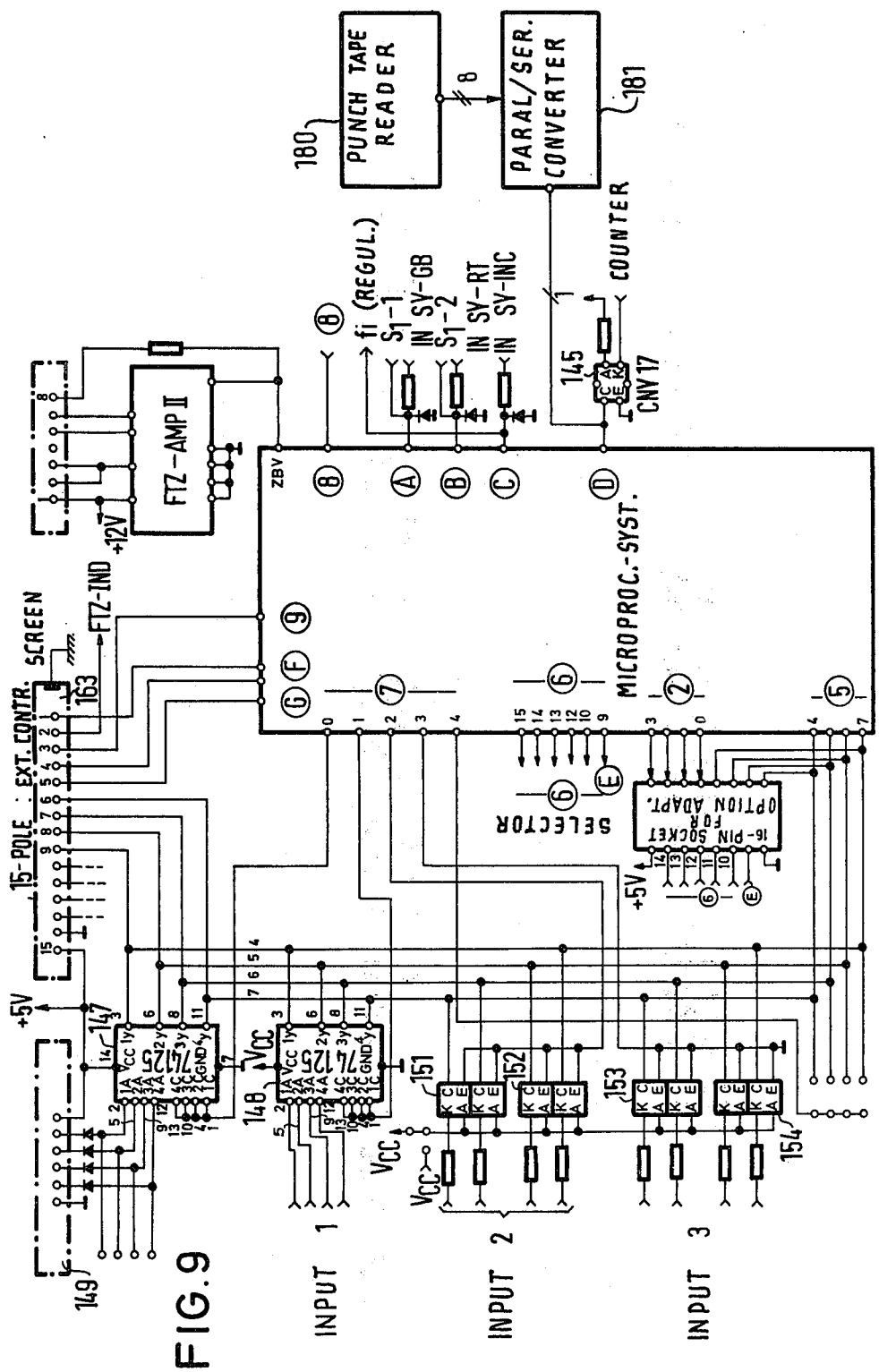
Figure 10:
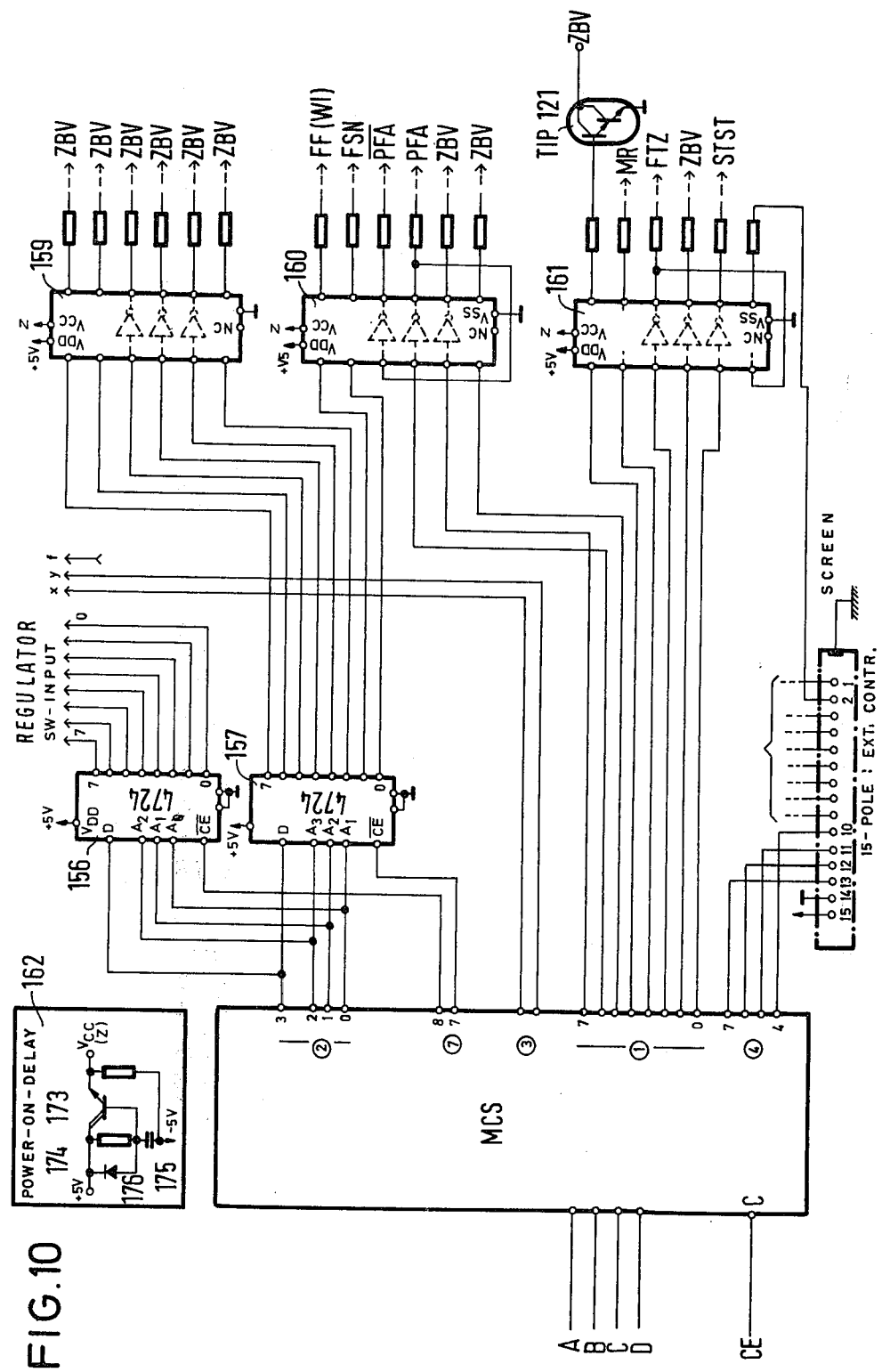
Figure 11:
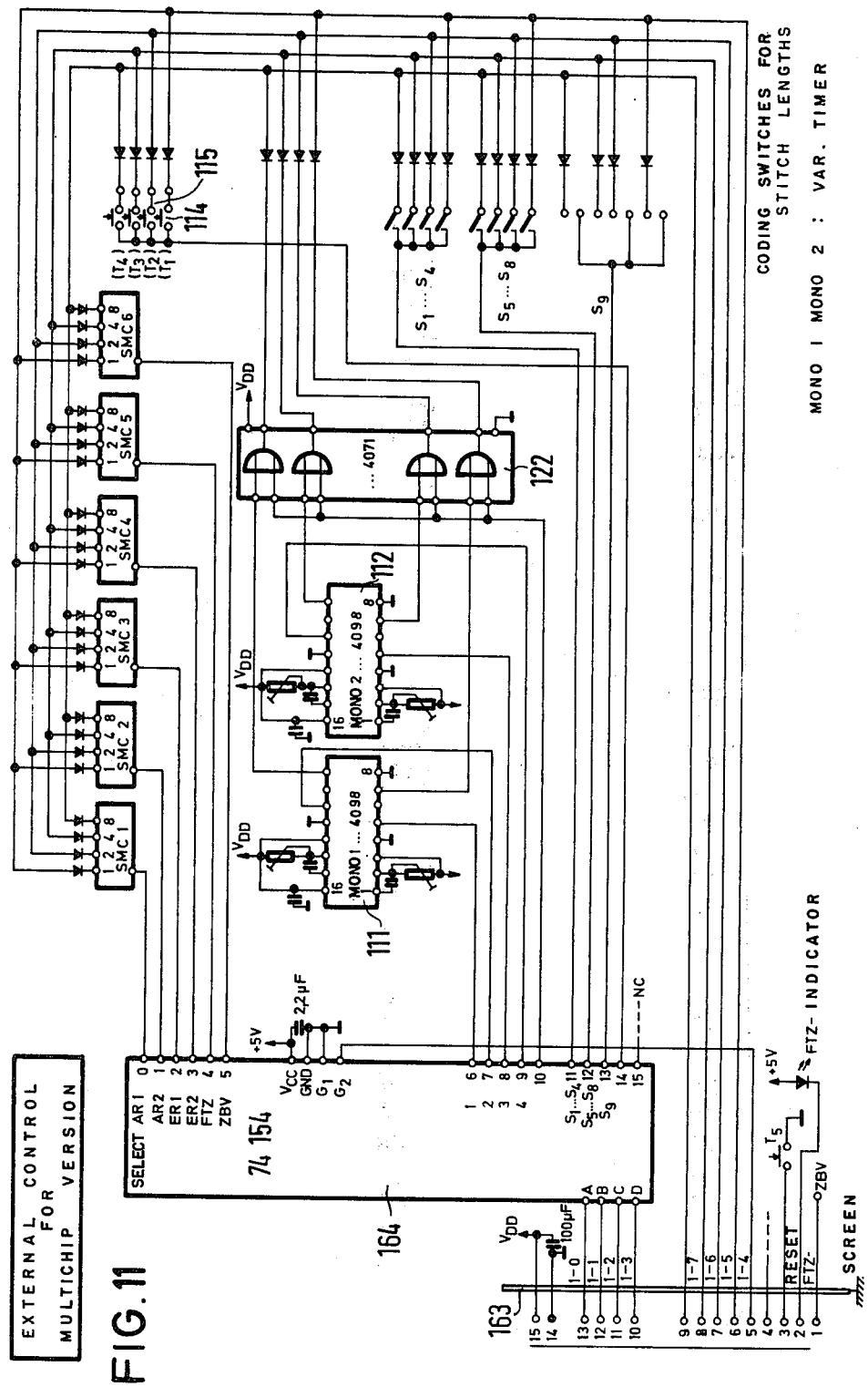

FIG. 8 the block diagram for a microprocessor-multichip system as per a modified embodiment of the invention, FIG. 9 an input schematic for the system as per FIG. 8, FIG. 10 an output schematic for the arrangement as per FIGS. 8 and 9, FIG. 11 a block diagram of an external operating arrangement for the multi-chip system, and FIG. 12 a schematic, showing in principle the circuit of the input/output unit with multiplexer system for increasing the number of function outputs.

In FIG. 1, numerals 10 and 11 denote, respectively, a brake amplifier and a coupling amplifier, with their outputs connected respectively, to the brake and coupling windings of an electromagnetically controlled coupling motor 1 próvided with a coupling-braking unit. Coupling motors of this type are knwon per se, (U.S. Pat. Nos. 3,487,438, 3,761,790) and need no closer explanation. There is provided a phase-locked loop (PLL) system for speed control of the electric motor by alternatingly energizing the brake winding or coupling winding by the principle of three-point control, with a voltage-controlled oscillator (VCO) and a phase-referenced comparator being combined into an integrated PLL module 13. PLL systems allow, in the manner known per se, the use of a phase comparator for bringing frequency and phase position of a voltage-controlled oscillator into a fixed, defined relation with, respectively, the frequency and phase position of an input signal. The voltage input 8 ($U_1$) of PLL module 13 which, e.g. may consist of circuit 4046, is connected by a high-ohm resistor 14 to a voltage divider consisting of resistors 15, 16 and a diode 17. The static direct voltage resulting across the voltage divider 15, 16, 17 will serve for basic balancing of the system, with diode 17 providing temperature compensation. In given instances, a temperature-sensitive resistor may be provided instead of diode 17.

Actual transmitting of desired speed to the positioning drive is effected by a RC network acting upon the voltage-controlled oscillator via inputs 11 ($R_1$) as well as 6 and 7 (C) of the voltage-controlled oscillator. To this end, the desired-speed regulator explained below with the use of FIG. 3, is scanned as per FIG. 2 by the microprocessor system 2. The desired value is incrementally applied via eight lines, 20 to 27. Lines 20, 21 22 are connected to the address inpts A, B, C of an analog switch 29 (for instance of model 4099) executed in C-MOS technology, said switch allowing its unblocking via line 23 leading to its ENABLE input EN. Corresponding to the three address inputs A, B, C, a quantity of $2^3=8$ different resistance values are selectable which are determined by potentiometers or resistors 30 to 40, connected on their part to inputs 0 to 7 of analog-switch module 29. The output OUT of module 29 is connected to input 11 of PLL module 13 via a resistor 42. Selection of the frequency-determining capacitors 44, 45, 46 is effected via lines 25, 26, 27 and one transmission-gate stage 47, said stage forming four electronic switches $S_1$ to $S_4$ in MOS technology, said switches being schematically indicated in FIG. 1. A capacitor 48, connected to inputs 6, 7 of PLL module 13, is arranged parallel to capacitors 44 to 46 and appurtenant transmission gate switches. A potentiometer 49 is connectable to input 11 of module 13 via line 24 and switch $S_4$ of stage 47.

When for instance, the lowest desired speed is to be attained, it will be the highest capacitor combination and the highest resistance that are switched into the circuit. In this instance, capacitor 48, and, via stage 47, also capacitors 44, 45, 46 are applied in parallel to the C input 6, 7 of the voltage-controlled oscillator. The analog-switch module 29 is blocked via line 23. Only a potentiometer 50, likewise connected to input 11 of PLL module 13 is now activated, by means of which the lowest speed may be balanced. Correspondingly, the smallest capacitor and the smallest resistor will be activated to attain the highest speed of the drive. In this instance, capacitors 44, 45, 46 are inactivated via transmission-gate stage 47. Only capacitor 48 is applied to the voltage-controlled oscillator. The lowest possible resistance is applied via analog-switch module 29 to the R input of the oscillator. The potentiometer 40 will serve herein for balancing the maximum speed.

The desired intermediate values for the rotating speed are obtained by circuiting the different possible R and C combinations. Potentiometer 35 serves for influencing the desired-value curve in the lower speed range. Potentiometer 49 may, for instance, by provided in order to set a predetermined switch-off speed, to which, proceeding from the respective operating speed, the drive is to be initially braked down, before the driven operating shaft, f.i. the arm shaft of a sewing machine, will come to its final halt at the desired angular position.

Such transition from operating speed to a defined switch-off speed for attaining the desired position is known per se (compare, for instance, U.S. Pat. No. 3,532,953).

The desired rotary-speed value is generated in the manner known per se (compare, f.i. U.S. Pat. No. 3,995,156) by means of an incremental angular encoder, not shown. Such an angular encoder may particularly be in the form of a disc provided with a narrow straight slot, said disc rotating within the path of rays of a light-sensitive barrier. The actual value of the driving speed will thus be present in the form of a rectangular signal of frequency $f_2$, being applied to input 14 of PLL module 13 via a line 51, said frequency being referenced by the comparator of said module to frequency $f_1$ generated by the voltage-controlled oscillator, said frequency $f_1$ being applied from the oscillator output 4 to comparator input 3 via line 52. The comparison actual/desired values speed may yield three possible control conditions or stages at comparator output 13 of PLL module 13:

$f_1 = f_2$ yields Z (high ohms)

$f_1 > f_2$ yields H $f_1 < f_2$ yields L
each of the three control signals Z, H or L from the comparator output 13 of the PLL module 13 is used for direct activation of coupling amplifiers 10, 11 via a line 53. Line 53 leads to voltage divider formed by resistors 55, 56, 57, 58, with the tapping point of said voltage divider, interposed between resistors 55, 56, being connected to the "+" input of braking amplifier 10, and the voltage-divider tapping point between resistors 57, 58, on its part, leading to the "−" input of coupling amplifier 11. There is provided a second voltage divider consisting of resistors 59, 60, 61. The tapping point between resistors 60, 61, is connected to the "−" input of brake amplifier 10. The tapping point between resistors 59, 60, is connected to the "+" input of coupling amplifier 11. An output signal at comparator output 13 as per FIG. 4a results in a coupling signal and a braking signal at outputs of final stages 10, 11, and this is evident from, respectively, FIG. 4b and 4c.

Via a feedback loop containing resistor 63 and also capacitors 64, 65, the comparator output signal will act as inverse feedback onto input 9 of the voltage-controlled oscillator. The inverse feedback signal is being integrated by means of capacitor 64. The remaining proportion of alternating potential is superimposed via differential capacitor 65 onto the direct voltage level $U_1$ of the voltage-controlled oscillator. The RC member 63, 64, has a time constant $\tau > 10$ ms.

In built-up state, the frequency of the pulse-pause ratio at comparator output 13 will be greater than 1 KHz. This signifies that the inverse-feedback proportion via capacitor 65 will fall toward ZERO. The mode of frequency-dependent inverse feedback as demonstrated herein, will provide a relatively strong inverse feedback within the range of lower rotating speeds, where the drive is susceptible to vibrations. Only low reverse feedback is ensured however, at higher operting speeds of the drive at which there exists, anyway, no or only a small tendency to vibrate.

Any change of desired value or load (either of which will also cause a change in the actual value) will immediately result in a phase fluctuation between $f_1$ and $f_2$. The frequency of the actual-value signal will become asynchronous to the frequency of the voltage-controlled oscillator. A change in the pulse/pause ratio will ensue. The regulator will follow until equality between $f_1$ and $f_2$ has been restored and the signal Z appears at the output of comparator 13, so that neither brake nor clutch will be energized. The PLL regulation as described, is furthermore of the particular advantage vs customary amplitude regulation, that regulation in built-up state will have a deviation nearly approaching ZERO. Since the purely digital output signals of the comparator are directly used for controlling coupling and brake, interferig time constants are obviated. Digital three-point control is ensured by the output of the comparator assuming three switching states. The final stages 10, 11 will perform switching operations without requiring additional expenditure for circuitry. Torque regulation of the drive motor will ensue by varying the pulse/pause ratio (FIG. 4).

A transistor 67 may be triggered via input X and line 66, so that in case of need, for instance for final braking of the operating shaft when it has reached the desired position, the PLL module 13 will be isolated from the inputs of final stages 10, 11 and the brake is positively activated. The coupling may herein be de-energized via an input Y and a resistor 68. The following function states will obtain:

| X | Y | State |
|---|---|---|
| 0 | 0 | Brake on, coupling on |
| 0 | 1 | Brake off, coupling on |
| 1 | 0 | Brake on, coupling off |
| 1 | 1 | Brake off, coupling off |

The desired-value transmitter shown schematically in FIG. 3, is provided with four superimposed light barriers, each of which consisting of a light-emitting diode 70, 71, 72, 73 and a photo transistor 74, 75, 76, 77. The outputs of photo are connected via a final-stage module 78 to the output lines 80 to 83. Lines 80 to 83 lead to inputs E1 to E4 of an incremental switching module 85 of the control unit as per FIG. 4. A coded disc 86 (FIG. 3A) is movably located in the path of rays between diodes 70 to 73 and transistors 74 to 77. The coded disc 86 is provided with perforations 87 to 90, appurtenant to light barriers 70, 74; 71, 75; 72, 76 and, respectively, 73, 77. For transmitting the desired speed, coded disc 86 may be set as desired, for instance by means of a sewing machine pedal. The coded disc 86 used here as embodiment example allows transmitting the following desired value signals:

PRW Pedal backward
PLRW Pedal slightly backward
O Pedal in rest position
PLVW Pedal slightly forward
1 to 12 Pedal forward according to twelve different rotating-speed stages.

The control unit as per FIG. 2 is designed as single-chip system and in essence comprises one microprocessor module 92 (for instance model 3870), an interrupt selector module 93, a multiplexer 94 and the aforenoted incremental switching module 85. The microprocessor 92 is provided with th following switching arrangement:

PO/O to PO/7—Control signals for speed regulator (PO/O to PO/3 - Lines 20 to 23; PO/4 to PO/7-lines 24 to 27);

P1/0 to P1/1—Address outputs for interrupt selector 93. $2^2 = 4$ interrupt variations;

P1/2 to P1/3—Inputs for operating keys, f.i. change of needle position (CH.POS.) and change of seam-lock stitch program (CH.RIE.). For the purpose of galvanic isolation, these inputs are connected via optical couplers 95, 96.

P1/5 to P1/6—Control signal outputs connected to inputs X, Y as per FIG. 1, and serving for unblocking the brake and de-energizing the coupling;

P4/0—Test input for success-interrupt (test whether signal is statically applied in order to eliminate interference pulses);

P4/1—Signal output for stitch positioner (STST), i.e. the cylinder for changeover of fabric feed from forward to backward or vice versa;

P4/2—Signal output for "Photocell bright", (FTZ; when using light barriers for sensing the seam end);

P4/3—Signal output for "Motor running" (MOT);

P4/4—Signal output for "Thread cutter" (EN);

P4/5—Signal output for, respectively, "Thread pickup" or "Thread slackener" (WB);

P4/6—Signal output for "Presser foot" (PFA);

P4/7—Reserve output (NC).

In the above, PO/O denotes, for example port O, bit O.

There are provided as input channels, specific to this system:

EXT/INT interrupt input for the input element selected via interrupt selector 93, namely
signal for upper-position indicator (angular encoder or synchronizer) (SY-GB)
Signal for lower needle position from position indicator (SY-RT)
Pulses at actual-speed frequency from angular encoder for determining rotational speed (SY/INC)
Signal from photo-cell amplifier (FZT-AMP)
Reset input for resetting the arrangement XTL1, XTL2
Input for the system-frequency governing RC member 97, for which, in given instances, a quartz may be used.

An external unit with operating controls may be connected via address lines A, B, C, D of FIG. 2 and data lines 100 to 103. An example embodiment of such an external operating-controls unit is illustrated in FIG. 5. The external operating-control unit consists in essence of a multiplexer 105, encoding switches 106, 107, 108, 109, 110 as well as timers 111, 112.

With the arrangement described afore, the following functions may be actuated:

| | | |
|---|---|---|
| Start-of-seam lock stitch | (AR) | The encoding switches 106, 107, allow lengthwise preselection of start-of-seam lock stitches from 1 to 15 stitches (single-lock stitch) to 2 to 30 stitches (double-lock stitch). |
| End-of-seam lock stitch | (ER) | The encoding switches 108, 109, allow lengthwise preselection of end-of-seam lock stitches in the same manner as with start-of-seam lock stitches. |
| Presser foot | | In position PLVW (pedal slightly forward) of encoding disc 86, the presser foot is lowered as a matter of principle; in encoding-disc positions PLRW (pedal slightly backward) or PRW (pedal fully backward after cutting), the presser foot is raised as a matter of principle. In encoding-disc position 0, (pedal in rest position) various options are available depending upon different switch positions as will be explained more closely farther below. |

The needle position at needle standstill may be preselected. The needle position may be changed by pressing a key.

Photo cell - end-of-seam switching (FTZ)

1 to 15 braking stitches may be selected via encoding switch 110 with this function, which may also be inactivated if so desired.

After completion of braking stitches, the end-of-seam lock is automatically initiated, and by means of a diode matrix D1 to D8 which may be arranged to customers specifications, it will be possible to select whether the sewing machine is to start sewing with the photocell switched on.

Time-dependent incremental switching to desired speed

In order to avoid excessive stress, it is desirable with various sewing-machine models to avoid sudden large surges of the desired speed. In a manner to be described more closely below, the lowest rotational speed is used when commencing and the subsequent, higher, speed increment will become effective only after the respective delay period has elapsed in the time element.

The most usual functional cycles may be selected by an internal operating panel. Multiplexing of occurring signals will provide herein that the cable leading to the external operating panel (FIG. 5) need consist of only eight control lines (data lines 100 to 103 and address lines A, B, C, D) as well as strands for the supply voltage.

All essential signals are free from interference in respect of software.

The addresses selected by the multiplexers 94 (FIG. 2) and 105 (FIG. 5), denote the following:

Multiplexer output

0: Selection of desired-speed transmitting unit (FIG. 3)
1: Starting timers 1 and 2
2: Starting timer 3
3: Starting timer 4
4: Unblocking of reading timer
5: Read diode matrix D1 to D4
6: Read diode matrix D5 to D8
7: Read S1 to S4 with following connotation
  S1: PFA=H after cutting
  S2: PFH=H before and after cutting
  S3: unblock photo cell S4, selection of needle position at motor stop.
8: Read S5 to S8 with following connotation
  S5: Select, start-of-seam lock, single stitch
  S6: Select, start-of-seam lock, double stitch
  S7: Select, end-of-seam lock, single stitch
  S8: Select, end-of-seam lock, double stitch
9: Reserve address, no switch provided
10: Start timer for running-up time
11: Select number of stitches for braking stitches
12: Select number of stitches for double end-of-seam lock
13: Select number of stitches for single end-of-seam lock
14: Select number of stitches for double start-of-seam lock
15: Select number of stitches for single start-of-seam lock In case of the aforedescribed arrangement, a program will proceed as in the following example:

After activating the positioning drive the microprocessor 92 is automatically reset. The value ZERO is written herein into the address register of module 92. Proceeding from address ZERO, the microprocessor 92 will run through an initialization routine in order to obtain a defined setting of the input and output channels. The microprocessor 92 will thereupon transit into the main program. The input elements (for instance the pedal-operated desired-value transmitter as per FIG. 3) relevant to the respective point in time, are cyclically scanned by the multiplexer principle. The multiplexers 94 and 105 will herein select the respective input module.

In the case presently under consideration, the multiplexer 94 will select the incremental switching module 85. The pedal-depending position of coded disc 86 is read by means of this module as desired value. The other inputs are statically applied to the microprocessor.

Once the pedal position O has been recognized, a jump is made back to the beginning. The sequence is repeated until an input unit is operated, one of the two keys 114, 115 (FIG. 5) for position change (CH.POS.)

or lock-seam change (CH.RIE) is operated, or until a pedal-position value deviating from O has been recognized. In pedal position "lightly backward" (PLRW) corresponding to signal 0111 at the light-barrier outputs of the desired-value transmitter as per FIG. 3, the microprocessor 92 will cause a signal to P4/6 (i.e. Port 4, bit 6), with said signal, via output line PFA resulting in raising the presser foot. A static signal will thus travel via line PFA to a presser-foot magnet for activation of an electromagnetic presser-foot valve as known per se. Upon a change in pedal position, this function will be cancelled.

A sewing cycle will be initiated as soon as a pedal position "forward", i.e. one of the positions 1 to 12 of coded disc 86 has been recognized.

In the course of a sewing cycle, the multiplexer 105 is initially switched to switch 117 (AR1/AR2) appurtenant to encoding switches 106, 107. The respective switch-position value is read in. It is being checked thereby, whether a start-of-seam lock is to be sewn. By the address signals coming from microprocessor 92, the multiplexer 94 is set for the incremental switching module 85, this in order to read in the value corresponding to the respective pedal position and to switch the respective desired-speed value in increments to the rotational-speed regulator as per FIG. 1, switching ensuing via outputs P0/07 and lines 20 to 28. If switch 117 is in position AR1, it will be recognized that a start-of-seam lock is to be made. The value for desired rotational speed for the start-of-seam lock is applied to P0/07, whereby the speed-selector module 29 is adjusted to the corresponding value. The output 4 of module 29 is activated. Resistor 33 is energized. This resistor, constructed as potentiometer allows stepless adjusting of the lock-seam speed. The multiplexer 105 is set for the encoding switch 106. The value for the number of lock stitches programmed into said encoding switch is read via data bus (lines 100 to 103) and via port 5, bits 4 to 7, into a respective register of microprocessor 92. The interrupt selector 93 is set to SY-RT. The signal of the position indicator for the lower needle position is applied to the respective input 120. At every revolution of the position indicator a signal will appear via interrupt selector 93 at interrupt input of microprocessor 92, thereby initiating an interrupt.

The interrupt routine will decrement that microprocessor register into which the stitch-number value of encoding switch 106 has been read. This is being continued, until value ZERO has been reached in the register. The interrupt is then being blocked. The multiplexer 105 is then set for the encoding switch 107 containing the second number of stitches of the start-of-seam lock. Since the subsequent number of stitches must be sewn in the backward direction, the stitch setter STST must be activated via P4/0.

The interrupt is activated again. The following steps will ensue analagous as with lock-seam length AR1.

When the counter decrementing the aforenamed microprocessor register has again reached ZERO value, timer 111 is started via multiplexer 105, output 2(D), and said timer may consist of a known monoflop, for instance of model 4908. The multiplexer 105 is the set for an input module 122, (for instance of model 74125). The timer 111 serves for actuating via module 122 the data but 100 to 103 after port 5, bit 4 of microprocessor 92.

This state is scanned in a loop, until it is reset after the period predetermined by timer 111 has elapsed. Thereafter, the function of stitch setter STST is again set to ZERO (port 4, bit 0). The variable timer 111 is to serve for compensation of mechanical delays in the stitch-setter system. The multiplexer 94 is set for the incremental switch module 85 in order to sense the pedal position. In pedal position "forward", a desired value for the rotational speed is incrementally switched on in the aforedescribed manner. This desired value is analogous to the pedal position. Sensing ensues in stages 1 to 12 (reference FIG. 3). If the pedal is brought into position ZERO, the positioning process is being initialled. Further input units are cyclically scanned.

The function "end-of seam" by using light barrier (FTZ) is to be explained herein as example. During sewing, the multiplexer 105 is set for a switch 123 (FTZ). The appurtenant encoding switch 110 is scanned via the data bus and port 5, bit 5. In case of positive evaluation, the interrupt selector 93 is set to input 124 (FTZ-AMP). The interrupt for photo cell routine will be initialized. In pedal position ZERO this sequence is blocked. The reason therefor is that no end-of-seam signal may be transmitted when the fabric has been removed. If, during sewing, the photo cell appurtenant to the respective light barrier becomes "bright", an interrupt will be triggered.

The photo cell sub-program is processed by setting an interrupt timer to a value appropriate to the desired speed value, i.e. t=7 ms.

During running of the timer, sensing is made via port 4, bit 0 of microprocessor 92 to determine whether the photo cell signal is being statically applied. This serves as interference scanning. If the signal is not statically applied, it will be recognized as interference peak; the FTZ routine will be abandoned. If the photo cell signal is statically applied, the timer interrupt will be triggered after the timer period has elpased, and the resetting command will be skipped. The actual FTZ routine will begin. Simultaneously, a signal "FTZ bright" will be emitted via port 4, bit 2 of microprocessor 92. The multiplexer 105 is set for the encoding switch 110. The value for the number of braking stitches is read from encoding switch 110 into microprocessor 92 via data bus 100 to 103. The number of braking stitches is introduced via databus 100 to 103; the read-in value is then transferred into the counting register of microprocessor 92. The interrupt selector 93 is set to the positioning signal for the lower position (SY-RT). The braking stitches are then being processed in the aforedescribed manner. When the microprocessor register has been decremented to ZERO, the multiplexer 105 is set for switch 125 (ER1/ER2) for end-of-seam lock sensing. When an end-of-seam lock has been selected, a sewing cycle will proceed analogous to forming the start-of-seam lock, with the exception that setting the length of this seam will ensue via encoding switches 108, 109.

After completion of the end-of-seam lock, the multiplexer 94 is set for the diode matrix D1 to D8 (FIG. 2). The thread-cutting program as predetermined by the diode matrix is then selected and processed, with the rotary-speed regulator switching to the thread-cutting speed. The speed-selector stage 29 is blocked herein. The thread-cutting speed is predetermined by the transmission-gate stage 47. The interrupt selector 93 is set to input 126, to which the incremental signals of angular encoder (XY-INC) are being applied. As indicated in the flow chart in FIG. 6A, the rotary speed is determined by the microprocessor 92 comparing the speed-dependent time unit of the desired-value transmitter (angular encoder) with the internal-time increment of the microprocessor according to the relation tv - tx . n.

In the above, n is a value specific to the rotary speed, and is being decremented per time unit tx.

Sensing the rotary speed proceeds from the condition that after the respective rotary speed of the positioning drive and the machine work-performing machine actuated by the drive has been sensed by an incrementing angular encoder, an actual-value signal for the speed is generated in the shape of a rectangular voltage of constant amplitude and speed-dependent frequency. Every speed-dependent "window size" of the rectangular voltage of the actual speed may thus be allotted a specific quantity of time increments of the microprocessor system. This specific quantity of time increments is loaded into a register and counted during one "window width". When after sensing, the register has reached value ZERO, the rotary speed will be of the desired value. The principle of this method of speed sensing is shown in FIG. 6, wherein "start" in the upper time diagram indicates commencement of the counting procedure and "stop" indicates the moment when the register is sensing.

When the predetermined thread-cutting speed has been reached, the thread-cutting procedure is unblocked by the interrupt selector 93 being set to the positioning signal SY-RT (position low) and the interrupt being activated. It will be awaited in a loop, until the flank of signal SY-RT triggers the interrupt. The interrupt will cause the thread-cutting procedure to proceed according to customers specifications.

Subsequently, the positioning signal SY-GB (position high) applied to input 127 is selected via interrupt selector 93 and the interrupt activated after the unblocking of the positioning has been rendered accessible by means of digital speed sensing of the switch-off speed, made according to the aforedescribed sensing of the thread-cutting speed. Upon reaching of the desired position, the brake is being energized via final stage 10 for a period of 200 ms. The operating shaft is being halted. The cycle has been completed.

A relevant flow diagram is shown in FIG. 7.

It may be desirable in practice to avoid a jump-like incremental rise of the desired-speed value, since the thread could be pulled from the needle thereby, or because the mechanism of the sewing machine may be adversely affected by shock-like stress. It is for this reason, that the control unit as per FIG. 2 is provided with a timer consisting of resistor 129 and capacitor 130. The circuitry is such that incremental increase to desired speed proceeds in a manner whereby transition from one desired-speed stage to the next will proceed only after the timer has run for the respective stage. After every run, the timer is set to ZERO. Subsequently, the timer is being scanned again. Only after the timer has run will transition to the next higher stage proceed. Zero setting of the timer ensues by transmitting a zero via output 10 of multiplexer 94, whereby the capacitor 130 will be discharged. Capacitor 130 is then recharged via resistor 129. The timer is being scanned via port 1, bit 7, of microprocessor 92, i.e. recognition is made whether switching threshold 1 has been reached or not. Transition from a lower desired speed to one higher by several steps would thus theoretically appear to be step-shaped. The drive will, however, provide for more or less strong flattening of the speed-rise curve. If so desired, the braking characteristics may also be influenced in a corresponding manner.

The multi-chip system as per FIGS. 8, 9, 10 and 11 also operates in a manner similar to the abovedescribed single-chip system. The multi-chip system will, however, permit complicated program cycles to be designed to customers specifications. To suit this purpose, no fixed program is provided but programmable memories may be inserted.

The multi-chip system MCS as per FIG. 8 comprises a central unit 135 (f.i. CPU 3850) with two i/o ports, (port 1 and 2). A 2 MHz quartz 136 as frequency-determining module, is provided appurtenant to central unit 135. A static memory interface 137, (f.i. SMI 3853) serves for generating the addresses for external program storage and comprises the first interrupt level. As demonstrated, commercially available 1K EPROMs 138, 139 (f.i. model 2708) or connection-compatible PROMs may be considered as program storages. Switching-on jumpers $J_1$, $J_2$ will allow changing the system to 2K EPROM models (2716). By switching-on a jumper $J_3$, it will also be possible to use an external RAM. A parallel input/output unit 140 (PIO 3971) contains two further i/o ports (port 4 and 5) and the second interrupt level. Arranging the circuit connecting the aforenoted modules will be made according to data-manual instructions.

An interrupt selector 151 for the memory interface 137, an interrupt selector 142 for the parallel input/output unit 140 and a multiplexer 143 are, furthermore appurtenant to the multi-chip system. By switching-on the chip-select (ENABLE) input, a number of multiplexers, corresponding to the number of chip-select lines, may be used, as will be explained later by using FIG. 11.

According to the input schematic for the multi-chip system MCS as per FIG. 9, there are provided in particular:

A an input for positioning signal "low" (SY-GB)
B an input for positioning signal "high" (SY-RT)
C an input for the rectangular voltage of angular encoder for rotary-speed sensing (SY-INC)
D an input for an event counter decoupled by means of an optocoupler 145.

The inputs A–D lead to interrupt selectors 141, 142, of FIG. 8.

⑦ denotes the multiplexer lines for input-device select inputs, wherein selection of inputs is made via selector modules 147, 148. Module 147 will serve herein for selecting desired-value indicators connectable via an external indicator socket 149. The input groups identified in FIG. 9 by INPUT 1, INPUT 2 and INPUT 3, are selected by means of module 148. These inputs will be provided according to customers specifications (switches, keys, limit switches etc.). The eight inputs of groups INPUT 2 and INPUT 3 are decoupled by means of optocouplers 151–154 and may thus be galvanically isolated from the system. The INPUTs are read in via inputs ⑤.

FIG. 10 shows the output schematic for microprocessor system as per FIG. 8. The outputs of group ① are, herein, data that are statically applied to port 4 of stage 140, as well as outputs of group ② for data and addresses proceeding to output buffers 159, 160, 161 via latch stages 156, 157. The appropriate module is selected via CE (CHIP-SELECT), whereupon the date are dynamically read into latch stages 156, 157. Said data are then available at outputs 0–7 of the latch stages.

An external operating unit for the multi-chip arrangement is depicted in FIG. 11, connectable via a 15-pole plug 163 to the arrangement as per FIG. 9. This operating unit will comprise, in particular, a multiplexer 164 as well as encoding switches SMC1-SMC6, driven by said multiplexer and controlling start-of-seam locks (AR1 and AR2), end-of-seam locks (ER1 and ER2), the brake-stitch number (FTZ) and a stapler (ZBV). Selection of start-of-seam locks and end-of-seam locks is made by switches S1 S2 or, respectively, S3, S4. Switches S5, S6 serve for presser-foot selection. FTZ is switched on via switch S7, whilst S8 and S9 serve for activating needle position and stapler (ZBV). Similar to the arrangement as per FIG. 3, there are provided keys 114, 115 (T1, T2) for, respectively, changing position or seam locks.

The timers 111, 112 and input module 122 are, furthermore, provided in the aforenoted arrangement.

Functioning of the multi-chip system will, in its essential characteristics, but excepting program storage, conform to that of the single-chip system, so that a detailed explanation may be dispensed with.

Providing the data outputs with storage flip/flops, (latches), selected by a multiplexer system, allows increasing of function outputs in an extremely economical manner. This is shown in the principle schematic of the input/output unit as per FIG. 12. As shown, there is provided an address bus ADR2, applied to all input-/output modules, namely the storage flip/flops and data selectors, of which only three storage flip/flops 168, 169, 170, and one data selector 171 are depicted. One of a plurality of multiplexeres 166, 167 is set via address bus ADR1 for the module to be selected (storage flip/flop 168-170, or data selector 171). ADR2 then selects the address of the data selector and latch. A selected bit of the latch is then activated via data line DATA with the respective state, or the state of the selected data selector is taken into the microprocessor system.

In case of an input, the bit number is selected via address line ADR2.

The module is being selected via the respective multiplexer, for instance 166. The state of the selected bit is then read in via the date line.

For an output, the address is selected via the ADR2-channel. The data channel is activated with an appropriate value. The respective storage flip/flop is selected via the relevant multiplexer. As soon as value "0" is applied to chip-select input $\overline{CE}$, the respective value will be available at the output of the storage flip flop.

It becomes necessary, first to reset the microprocessor system by switching-on of the supply voltage. Several milliseconds will elapse, until the microprocessor system has initialized itself. Any random states may exist in the output latches or buffers and will not be influenced by the reset line. For a defined determination of these states until the microprocessor system has initialized itself, and initialization is activated which will then set the latches to zero, provision must be made for bridging over. A power-on-delay stage 162 (FIG. 10) is provided for this purpose. Stage 162 is provided with a transistor 173, the base of which will be drained to −5V upon switching-on of the supply voltage. Charging of a capacitor 175 will ensue over a resistor 174. After a predetermined period, the capacitor 175 will reach a desired charge-value. The supply voltage $V_{cc}$ will only then be available at output Z of stage 162, said output being connected to the respective inputs Z of output buffers 159, 160, 161. A diode 176, parallel to resistor 174, will ensure that upon the drive being switched off, the Z input of the output buffers will immediately return to 0V. The supply voltage of +5V will collapse immediately upon switch-off. The charge carriers may drain via diode 176 to the +5V input which has been drained immediately to zero.

As can be seen from FIG. 9, it is possible to alternatively connect at input D, instead of the event counter 145, a program-carrier reader, particularly a commercially available punched tape reader 180, such connection being effected via a parallel/series converter 181. The converter 181 serves not only for conversion into a series data-flow of the program commands read out in parallel from the punched tape, but it will also act as pulse former. The punched tape reader 180 allows particularly simple and rapid programming by input of the punched-tape recorded program into the program storage of the system.

The table below contains a listing of model numbers and manufacturers of the semiconductor modules as provided in the embodiment of the invention explained by using the drawings:

| Reference | Schedule of Semiconductor Modules used | |
|---|---|---|
| | Nomenclature | Model |
| 13 | PLL module | 4046 Valvo |
| 29 | Analog switch | 4051 RCA |
| 47 | Transmission gate stage | 4016 RCA oder Valvo |
| 78 | Final stage module | 4093 Motorola |
| 85 | Unblocking module | 74125 Texas Inst. |
| 92 | Microprocessor module | 3870 Mostek |
| 93 | Interrupt-selector module | 74153 Texas Inst. |
| 94 | Multiplexer | 74154 Texas Inst. |
| 95 and 96 | Optical coupler | MCT6 Monsanto |
| 105 | Multiplexer | 74154 Texas Inst. |
| 106 to 110 | Encoding switch | T 50 Cherry |
| 111, 112 | Timer | 4098 RCA |
| 122 | Input module | 74125 Texas Inst. |
| 135 | Central unit | 3850 Mostek |
| 136 | Quartz | 2.09 MHz OEM-E1. |
| 137 | Static memory interface | 3853 Mostek |
| 138, 139 | EPROM | 2708 (2716) Mostek |
| 140 | Parallel input/output unit | 3871 Mostek |
| 141, 142 | Interrupt selector | 74153 Texas Inst. |
| 143 | Multiplexer | 74154 Texas Inst. |
| 145 | Optocoupler | CNY 17 Siemens |
| 147, 148 | Selective module | 74125 Texas Inst. |
| 151 to 154 | Optocoupler | MCT6 Monsanto |
| 156, 157 | Latch stage | 4724 Valvo |
| 159, 160, 161 | Output buffer | 4502 Motorola |
| 162 | Power-on delay stage | RC - Texas Inst. |
| 164 | Multiplexer | 74154 Texas Inst. |
| 166, 167 | Multiplexer | 74154 Texas Inst. |
| 168, 169, 170 | Storage flip-flop | 4724 Valvo |
| 171 | Data selector | 4051 RCA |

We claim:

1. Positioning drive for a sewing machine having a variable speed coupling motor and means coupled to said motor for performing different sewing functions such as needle positioning, thread cutting, feed adjustment and the like, comprising an at least 8-bit microprocessor system provided with input connections which are connectable to a program data source, and output connections to said motor and to said functional means to control the sewing machine by controlling the rotary speed and/or angular position of the motor, and to control the operation of said functional means according to said program data source, and further comprising an actual-speed-value transmitter, the speed-dependent time unit of the actual-speed-value transmitter being comparable by means of the microprocessor with the internal time increment of the microprocessor system, and by a function being triggerable only after a predetermined reference value has been attained.

2. Positioning drive as defined in claim 1 and further comprising a multiplexer for signal input to the microprocessor system, said multiplexer being controlled from an operating console spatially separated from the drive unit.

3. Positioning drive as defined in claim 2, the multiplexer for activating the microprocessor system receiving signals from a desired-speed transmitter spatially separated from the drive unit.

4. Positioning drive as defined in claim 3, further comprising a time delay unit for delayed incrementing of desired speed in order to produce a predetermined running up and/or braking characteristic.

5. Positioning drive as defined in claim 4, further comprising a circuit for bridging the resetting period of the microprocessor system by means of delayed application of operating voltage for the outputs.

6. Positioning drive as defined in claim 1, further comprising a phase-locked loop system connected as a three-stage controller to said motor and serving as rotational-speed regulator.

7. Positioning drive for a sewing machine including a variable speed coupling motor having a coupling-and-braking magnet system, and means coupled to said motor and to said sewing machine, respectively, for performing different sewing functions such as needle positioning, thread cutting, feed adjustment and the like, comprising an at least 8-bit microprocessor system provided with input connections which are connectable to a program data source, and output connections to said motor and to said functional means to control the sewing machine by controlling rotary speed and/or angular position of the motor, and to control the operation of said functional means according to said program data source, and further comprising a three-stage speed controller including a phase-locked loop system which generates digital output signals, said phase-locked loop system having first and second input means connectable to a desired-speed-value transmitter and to an actual-speed-value transmitter, respectively, and having output means connected to said magnet system for direct energizing by said digital signals said magnet system to effect rotary speed regulation and angular position control of said sewing machine.

8. Positioning drive as defined in claim 7, the microprocessor system consisting of a single-chip system with fixed program.

9. Positioning drive as defined in claim 8, the microprocessor system consisting of a single-chip system with standard sewing programming.

10. Positioning drive as defined in claim 7, the microprocessor system consisting of a multi-chip system with a program storage that allows programming at will.

11. Positioning drive as defined in claim 10, and further comprising a program-carrier reader connectable for programming purposes to the program storage.

12. Positioning system as per claim 11, characterized by provision of a punched-tape reader as program-carrier reader.

13. Positioning drive as per claim 11, characterized by interposing an impulse former between the program-carrier reader and the program storage.

14. Positioning drive as defined in claim 10, the program storage being designed as RAM storage.

15. Positioning drive as defined in claim 7, the input/output connections of the microprocessor systems being connected via multiplexers to, respectively, output latches and input-data selectors.

16. Positioning drive as per claim 7, wherein the phase-locked loop system comprises a voltage-controlled oscillator and a subsequently arranged comparator acting as phase comparator.

17. Positioning drive as defined in claim 16, further comprising a feedback loop leading from the comparator output to the control-voltage input of the voltage-controlled oscillator.

18. Positioning drive as defined in claim 17, further comprising a filter member arranged in the feedback loop, said filter member attenuating the inverse feedback effect toward higher frequencies.

19. Positioning drive as defined in claim 17, wherein the presetting of desired rotational speed of the motor is effected by connecting different R and/or C values to the frequency-determining input of the voltage-controlled oscillator.

* * * * *